Jan. 15, 1952     D. W. KELBEL     2,582,487
TRANSMISSION
Filed April 7, 1945     2 SHEETS—SHEET 1
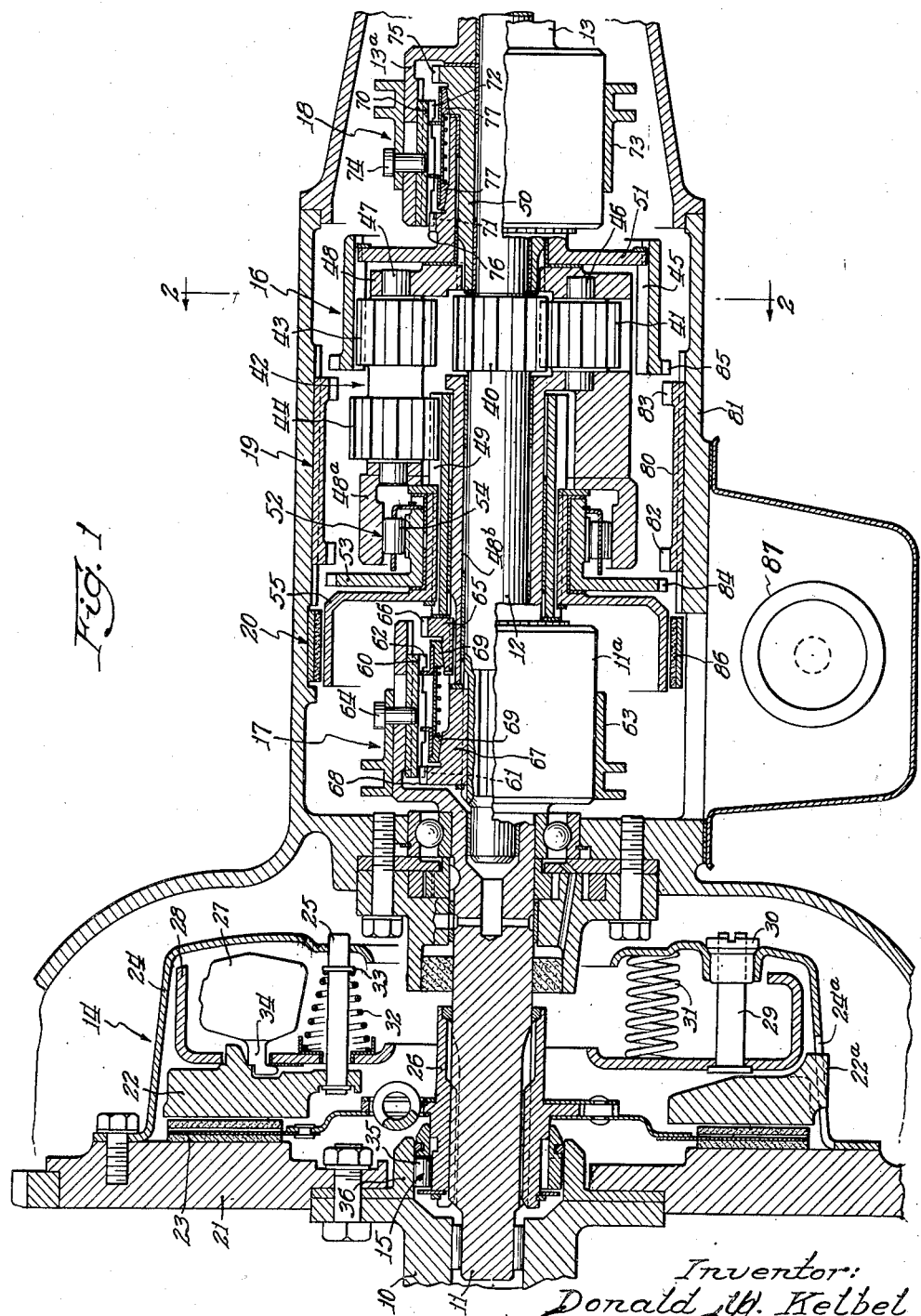
FIG. 1
Inventor:
Donald W. Kelbel Jan. 15, 1952     D. W. KELBEL     2,582,487
TRANSMISSION
Filed April 7, 1945     2 SHEETS—SHEET 2
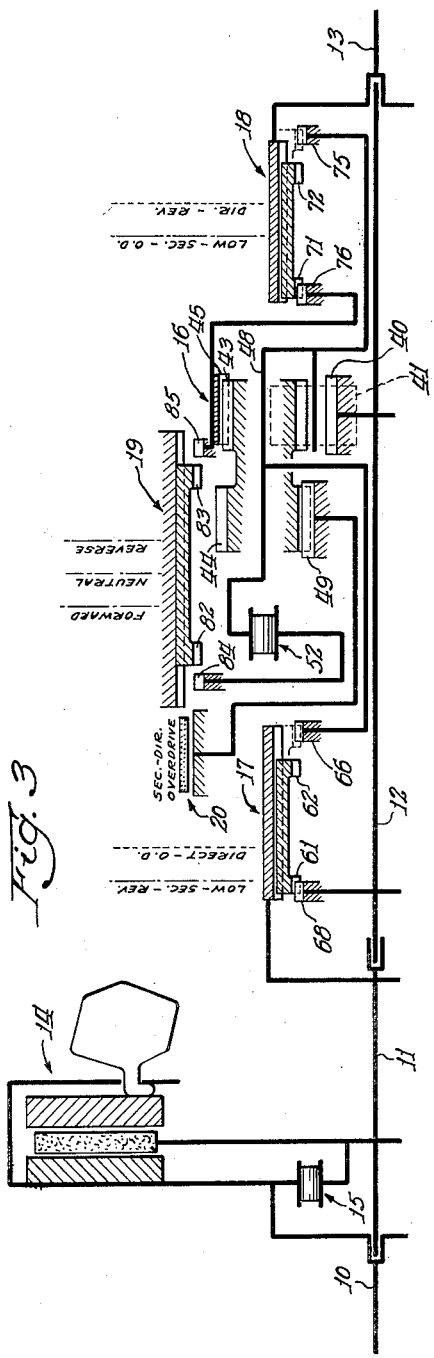
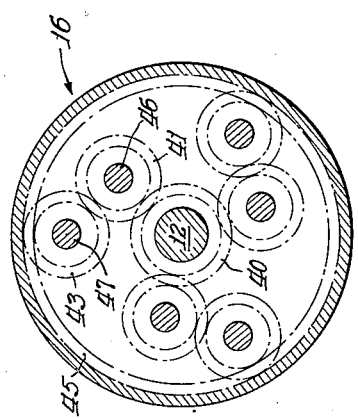
Inventor:
Donald W. Kelbel
By Edward C. Fitzhugh
Atty.

Patented Jan. 15, 1952

2,582,487

UNITED STATES PATENT OFFICE 2,582,487

TRANSMISSION

Donald W. Kelbel, Muncie, Ind., assignor to Borg-Warner Corporation, Chicago, Ill., a corporation of Illinois Application April 7, 1945, Serial No. 587,175

10 Claims. (Cl. 74—759)

My invention relates to transmissions for automotive vehicles and more particularly to such transmissions comprising planetary gearing.

It is an object of my invention to provide an improved transmission of this type providing a plurality of speed ratios between the driving and driven shafts and which is compact and is simple in construction and which may be economically manufactured.

It is a further object to provide a transmission of this type comprising two clutches, each of which has two engaging positions, with the clutches functioning to provide three different speed ratios, depending on the positioning of the clutches. It is contemplated that one speed ratio shall be provided when both clutches are in a first engaging position, another speed ratio shall be provided when both clutches are in a second engaging position and that still another speed ratio shall be provided when one clutch is in its first engaging position and the other clutch is in its second engaging position.

It is a more specific object of my invention to provide an improved planetary gear arrangement which is compact and simple in construction and which is particularly suitable for use in combination with the two clutches above mentioned for providing a plurality of speed ratios between the drive and driven shafts of the transmission.

The invention consists of the novel constructions, arrangements and devices to be hereinafter described and claimed for carrying out the above stated objects and such other objects as will appear from the following description of a certain preferred embodiment illustrated in the accompanying drawings, wherein:

Fig. 1 is a longitudinal sectional view of a transmission embodying principles of the invention;

Fig. 2 is a cross sectional view taken substantially on the line 2—2 of Fig. 1; and Fig. 3 is a diagrammatic illustration of the transmission shown in Fig. 1.

Like characters of reference designate like parts in the several views.

Referring now to the drawings, the illustrated transmission comprises an input shaft 10, a clutch shaft 11, an intermediate shaft 12 and a driven shaft 13. The shaft 10 may be connected with an internal combustion type driving engine (not shown) for an automotive vehicle and the shaft 13 may be connected with the driven wheels of the vehicle in which the transmission is installed. It will be noted that the shaft 11 is piloted in the shaft 10 and that the shaft 12 is piloted in both the shaft 11 and in the shaft 13. A centrifugal clutch 14 and a free wheeling clutch 15 are provided for connecting the shafts 10 and 11. A planetary gear set indicated generally at 16, positive type clutches 17 and 18, a positive type brake 19 and a friction brake 20 are provided for effectively connecting the clutch shaft 11 and the driven shaft 13 in a plurality of speed ratios, as will be hereinafter described.

The centrifugal clutch 14 comprises the usual fly wheel 21 for an internal combustion engine which is connected with the shaft 10, a pressure plate 22, and a driven clutch disc 23. The pressure plate 22 is connected with the fly wheel 21 so as to be rotatable therewith by means of a clutch cover 24 bolted to the fly wheel, studs 25 fixed with respect to the pressure plate 22 and extending through appropriate openings in the cover and ears 22a formed on the pressure plate 22 and extending through suitable slots 24a provided in the cover 24. The studs 25 are slidably disposed in their openings in the cover so that the pressure plate may move toward the fly wheel to clamp the clutch disc 23 therebetween for engaging the clutch. The clutch disc 23 is fixed to the clutch shaft 11 by means of its hub 26 which is splined to the shaft 11.

The pressure plate 22 is moved toward the fly wheel 21 to engage the clutch 14 in response to increase in the speed of the drive shaft 10, and such engagement is due particularly to the action of centrifugal weights 27 which rotate with the shaft 10. An intermediate plate 28 is provided within the cover 24, and this plate is adjustably fixed with respect to the cover by means of bolts 29 extending through the plate 28 and the cover 24. The bolts 29 are provided with nuts 30 fitting within suitable openings in the cover 24, and the nuts 30 may be adjusted for moving the plate 28 toward or away from the fly wheel 21. Springs 31 are provided between the plate 28 and the cover 24 for yieldingly holding the plate 28 in the position in which it is shown in the drawing. Springs 32 are provided effectively between the plate 28 and shoulders 33 on the studs 25, and these springs function to yieldingly hold the intermediate plate 28 and pressure plate 22 together.

The weights 27 are formed with lever portions 34, and these portions extend through the intermediate plate 28 and into contact with the pressure plate 22 and function to hold the plates 22 and 28 apart. The plate 28 and the weights 27 rotate with the cover 24 and fly wheel 21 due to the connection between the plates by means of the studs 25 and 29, and as the speed of the shaft 10 increases, the weights 27 move outwardly. On such outward movement of the weights, the lever portions 34 of the weights function to pry the plates 22 and 28 aart and to clamp the friction disc 23 between the pressure plate 22 and fly wheel 21 to engage the clutch, as is apparent from an inspection of the form of the lever portions 34 as shown in the drawing. The movement of the plates 22 and 28 apart is in opposition to the action of the spring 32, and the reaction on the plate 28 is taken by the springs 31 between the plate and the cover 24. The clutch 14 is thus engaged to couple the shafts 10 and 11 upon the speed of the former shaft increasing sufficiently.

The one-way clutch 15 comprises rollers 35 disposed between the hub 26 and a cylindrical portion 36 fixed with respect to the shaft 10. The hub 26 and portion 36 are formed with cams (not shown) on their inner surfaces which are of such shape that the rollers 35 will not engage between the hub and cylindrical portion when a drive is from the shaft 10 to the driven shaft 11; however, the rollers 35 will engage if the shaft 11 is rotated in the forward direction while the shaft 10 is not being driven. The overrunning clutch 15 thus assures a drive from the shaft 11 to the shaft 10 if the engine (not shown) for driving the shaft 10 is inoperative.

The planetary gear set 16 comprises a sun gear 40 formed on the shaft 12, pinions 41 in mesh with the sun gear 40, dual pinion units 42 comprising pinions 43 and 44, with the pinions 43 being in mesh with the pinions 41, and a ring gear 45 in mesh with the pinions 43. The pinions 41 and pinion units 42 are rotatably disposed on shafts 46 and 47 respectively, and these shafts are fixed within a planet gear carrier 48. A sun gear 49 is in mesh with the pinion 44 and is under the control of brake 20 as will appear.

The pinion carrier 48 is connected with a sleeve 50 rotatably disposed on the shaft 12, and the ring gear 45 is connected with a radial coupling flange 51 rotatably disposed on the sleeve 50. The carrier 48 is connectible through a one-way roller clutch 52 with a positive brake element 53. The clutch 52 comprises rollers 54 disposed between a cylindrical portion 48a of the carrier and the brake element 53, and suitable cams (not shown) are formed on the external surface of the brake element 53 so that when the latter element is held stationary, the rollers 54 engage to prevent a reverse rotation of the carrier 48. A friction brake element 55 is splined to the sun gear 49, as shown.

The clutch 17 is of the positive type and functions to connect the clutch shaft 11 with either the carrier 48 or the sun gear 40 of the planet gear set 16. The clutch 17 comprises a shiftable clutch element 60 splined to a cylindrical portion 11a of the clutch shaft 11 and provided with teeth 61 and 62. The shiftable element 60 is connected with a shift sleeve 63 by means of a pin 64 extending through the sleeve and into the shiftable element 60. A clutch element 65 having teeth 66 is splined to a sleeve portion 48b of the carrier 48, and a clutch element 67 having teeth 68 is splined to the intermediate shaft 12. The clutch 17 has two engaged positions, one in which the shiftable element 60 is shifted to interengage the teeth 62 and 66 and the other in which the shiftable element 60 is shifted to interengage the teeth 61 and 68, the element 60 being shown in the latter position of engagement. In the former position of the clutch 17, the clutch functions to couple the shaft 11 with the carrier 48. In the position in which it is illustrated, the clutch functions to couple the shaft 11 with the shaft 12 and the sun gear 40. Blocker synchronizer mechanism 69 of known construction is provided for preventing a shifting of the shiftable element 60 until the parts to be coupled thereby are in synchronism.

The clutch 18 is quite similar in construction to the clutch 17. This clutch also has two engaged positions and in one of these positions it functions to connect the driven shaft 13 with the ring gear 45 and in its other position it functions to connect the shaft 13 with the carrier 48. The clutch 18 comprises a shiftable element 70 splined within a cylindrical portion 13a of the shaft 13. The shiftable element 70 is provided with teeth 71 and 72, and a shift sleeve 73 disposed on the cylindrical portion 13a is connected by means of a pin 74 with the shiftable element 70 for moving the latter element. The sleeve 50 is provided with clutch teeth 75, and the flanged coupling element 51 is provided with clutch teeth 76. The clutch sleeve 70 in one engaged position has its teeth 72 interengaged with the teeth 75 to connect the sleeve 50 and thereby the carrier 48 with the driven shaft 13, and the clutch sleeve 70 in its other engaged position has its teeth 71 interengaged with the teeth 76 to couple the flanged coupling element 51 and thereby the ring gear 45 with the driven shaft 13, the shiftable element 70 being illustrated in the drawing in latter position. The clutch 18 comprises also blocker synchronizer mechanism 77 which is provided for preventing a shift of the shftable element 70 into either of its engaged positions until the parts to be coupled thereby are in synchronism.

The positive brake 19 comprises a shiftable sleeve 80 disposed within and splined to the transmission housing 81. The sleeve 80 is provided with teeth 82 and 83, as shown. The brake element 53 is provided with teeth 84, and the ring gear 45 is provided with teeth 85. The sleeve 80 is adapted to be shifted to interengage the teeth 82 and 84 to condition the transmission for forward drive, and the sleeve 80 is adapted to be shifted in the opposite direction to interengage the teeth 83 with the teeth 85 to condition the transmission for a reverse drive.

The friction brake 20 comprises a brake band 86 effective to engage the drum 55 and operated by any suitable operator indicated schematically at 87. The brake band 86 when effective brakes the drum 55 and thereby the sun gear 49 as is apparent, this brake being effective for second and overdrive speed ratios through the transmission, as will be hereinafter described.

In operation, the illustrated transmission provides low, intermediate, direct and overdrive speed ratios in forward drive and a reduced speed ratio in reverse drive. The shiftable element 80 of the brake 19 is shifted axially to the left in Fig. 1 interengaging the teeth 82 and 84 to condition the transmission for forward drive. Such engagement of the clutch 19 functions to hold the brake element 53 stationary so that the one-way clutch mechanism 52 functions thereafter as a one-way brake to prevent reverse rotation of the carrier 48 while allowing forward rotation of the carrier. For low speed ratio the shiftable clutch element 60 of the clutch 17 is in the position in which it is illustrated with the teeth 61 and 68 interengaged. The shiftable clutch element 70 of the clutch 18 is also in the position illustrated, namely, with the teeth 71 and 76 being interengaged. The clutch 17 thus functions to connect the shaft 11 with the intermediate shaft 12 and the clutch 18 functions to connect the ring gear 45 with the driven shaft 13. On an increase of speed of the drive shaft 10, the centrifugal clutch 14 engages, and the shafts 10 and 11 are thereby connected together. The power train from the shaft 11 is through the clutch 17 to the clutch element 67 and the shaft 12, through the gear 40, pinions 41 and 43, ring gear 45, coupling element 51, and clutch 18 to the driven shaft 13. In this speed ratio the planet gear 44 and sun gear 49 are ineffective, since the friction brake 20 is disengaged. The brake 19 and particularly the teeth 82 and 84 and also the roller clutch unit 52 take the reaction in this speed ratio.

The centrifugal clutch 14 remains engaged coupling the shafts 10 and 11 while the transmission is shifted to higher speed ratios. For intermediate or second speed ratio, the clutches 17 and 18 remain in the same condition as for low speed, namely, with the clutch 17 having its teeth 61 and 66 interengaged and with the clutch 18 having its teeth 71 and 76 interengaged. The friction brake 20 is applied for changing from low speed ratio to second speed ratio. This application of the brake 20 brakes the sun gear 49, and the drive through the transmission from the clutch shaft 11 to the driven shaft 13 is the same as in low speed ratio with the exception that the cooperation of the pinions 44 with the sun gear 49 held stationary by the brake 20 causes the driven shaft 13 to rotate at a higher or intermediate speed ratio. The sun gear 49 is now the reaction gear of the gear set, and the carrier 48 rotates with the roller clutch unit 52 overrunning.

For direct drive between the shafts 11 and 13, the friction brake 20 remains engaged while both of the clutches 17 and 18 are shifted axially to the right in Fig. 1 to their other engaged positions. The shiftable element 60 of the clutch 17 is shifted to interengage the teeth 62 and 66, and the shiftable element 70 of the clutch 18 is shifted to interengage the teeth 72 with the teeth 75. The clutch 17 thus functions to connect the clutch shaft 11 with the carrier 48 of the planet gear set 16, and the clutch 18 functions to connect the output shaft 13 also with the carrier 48. The power train in direct drive from the shaft 11 is through the clutch 17, the clutch element 65, the carrier 48 including its sleeve 48b, the sleeve 50 and the clutch 18 to the driven shaft 13.

For overdrive speed ratio between the shafts 11 and 13, the clutch 17 remains in its position as for direct drive with the teeth 62 and 66 being interengaged, and the clutch 18 is shifted back into its illustrated condition in which the teeth 71 and 76 are interengaged to again couple the ring gear 45 with the output shaft 13. In this speed ratio, the friction brake 20 also remains engaged. The power train in overdrive speed ratio from the drive shaft 11 to the driven shaft 13 is through the clutch 17, the clutch element 65, the carrier 48 including its sleeve 48b, the pinion gear 43 and ring gear 45, the flanged coupling element 51, and the clutch 18 to the shaft 13. In this speed ratio, as in second speed ratio, the sun gear 49 cooperating with the planet gear 44 functions as a reaction member for the gearing, and the ring gear 45 and thereby the shaft 13 are driven at an overspeed. In overdrive speed ratio, the gear 40 and pinion 41 do not function.

For reverse drive, the shiftable element 80 of the brake 19 is shifted to interengage the teeth 83 with the teeth 85 of the ring gear 45. The friction brake 20 is disengaged, the clutch 17 is in its illustrated condition in which the teeth 61 and 66 are interengaged, and the shiftable element 70 of the clutch 18 is moved to its rearward engaged position in which the teeth 72 are interengaged with the teeth 75. When the shaft 10 increases in speed sufficiently, the centrifugal clutch 14 functions to couple the shafts 10 and 11 together, and the power train from the shaft 11 is through the clutch 17, the clutch element 67, the shaft 12, the sun gear 40, the pinions 41 and 43, the carrier 48, the sleeve 50, and the clutch 18 to the driven shaft 13. In this case, the ring gear 45 being held stationary by the teeth 80 and 85 functions as a reaction member, and the carrier 48 together with the shaft 13 rotate in the reverse direction at a reduced speed ratio.

The illustrated transmission is advantageously compact, simple in construction, and it may be economically manufactured. The transmission furthermore provides four forward speed ratios with the use of only a single planetary gear set.

I wish it to be understood that my invention is not to be limited to the specific constructions and arrangements shown and described, except only insofar as the claims may be so limited, as it will be apparent to those skilled in the art that changes may be made without departing from the principles of the invention.

I claim:

1. In power transmission mechanism, the combination of a drive shaft, a driven shaft, means for providing a plurality of forward drive power trains at different speed ratios between said shafts and including a gear set and a pair of clutches, said clutches each having first and second engaged positions and when both are engaged completing said power trains, one of said power trains being completed when both clutches are in their said first engaged positions, another of said power trains being completed when both clutches are in their said second engaged positions and a third of said power trains being completed when one clutch is in its said first and the other clutch is in its said second engaged position, braking means for selectively providing a reaction in said gear set for those of said power trains the speed ratios of which are other than one to one, and one-way braking means for an element of said gear set for providing a low speed power train between said shafts and overrunning when said first named braking means are engaged for providing the other power trains between said shafts.

2. In power transmission mechanism, the combination of a drive shaft, a driven shaft, means for providing a plurality of power trains at different speed ratios between said shafts and including a gear set and a pair of clutches, one of said clutches being adapted to connect said drive shaft with elements of said gear set and having first and second engaged positions and the other of said clutches being adapted to connect said driven shaft with elements of said gear set and having first and second engaged positions, said clutches when both are engaged completing said power trains, one of said power trains being completed when both of said clutches are in their said first engaged positions, another of said power trains being completed when both of said clutches are in their said second engaged positions and a third of said power trains being completed when one of said clutches is in its said first and the other of said clutches is in its said second engaged position, a brake for an element of said gear set for providing a reaction for those of said power trains having speed ratios other than one to one, and a one-way brake for another element of said gear set for providing another power train between said shafts when both of said clutches are engaged.

3. In power transmission mechanism, the combination of a drive shaft, a driven shaft, means for providing a plurality of power trains at different speed ratios between said shafts and including a direct drive, said means comprising a gear set and a pair of clutches, one of said clutches being adapted to connect said drive shaft with elements of said gear set and having first and second engaged positions and the other of said clutches being adapted to connect said driven shaft with elements of said gear set and having first and second engaged positions, said clutches when both are engaged completing said power trains, one of said power trains being completed when both of said clutches are in their said first engaged positions, another of said power trains being completed when both of said clutches are in their said second engaged positions and a third of said power trains being completed when one of said clutches is in its said first and the other of said clutches is in its said second engaged position, said clutches connecting said drive and driven shafts with the same element of said gear set to provide said direct drive, a brake for an element of said gear set for providing a reaction for the other of said power trains, and a one way brake for an element of said gear set for providing a low speed power train between said shafts and overrunning when said first named brake is engaged for providing the other power trains between the shafts.

4. In power transmission mechanism, the combination of a drive shaft, a driven shaft, means for providing power trains at different speed ratios between said shafts and including a gear set and a pair of clutches, said gear set comprising a ring gear, a planet gear carrier, and a pair of sun gears, one of said clutches having first and second engaged positions for connecting said drive shaft either to one of said sun gears or to said planet gear carrier respectively, the other of said clutches having first and second engaged positions for connecting said driven shaft to either said ring gear or said planet gear carrier respectively, said clutches when both are engaged completing said power trains, one power train being completed when both clutches are in their first engaged positions, another power train being completed when both clutches are in their second engaged positions and a third power train being completed when said first named clutch is in its second and the other clutch is in its first engaged position, and a brake for the other of said sun gears for providing a reaction for those of said power trains having speed ratios other than one to one.

5. In power transmission mechanism, the combination of a drive shaft, a driven shaft, a planetary gear set for providing a power train between said shafts, said gear set including two planet gears in mesh with each other, a ring gear meshing with one of said planet gears and a sun gear meshing with the other of said planet gears, a planet gear portion connected with one of said first named planet gears, a sun gear in mesh with said last named planet gear portion, a carrier for said planet gears, means for connecting said carrier with said drive shaft, a brake for said last named sun gear, means for connecting said first-named sun gear with said drive shaft, and means for connecting said ring gear with said driven shaft.

6. In power transmission mechanism, the combination of a drive shaft, a driven shaft, a planetary gear set for providing power trains of different speed ratios between said shafts, said gear set including two planet gears in mesh with each other, a ring gear meshing with one of said planet gears and a sun gear meshing with the other of said planet gears, a planet gear portion connected with one of said first named planet gears, a carrier for said planet gears, a sun gear in mesh with said last named planet gear portion, a brake for said last named sun gear to provide one speed ratio, means for connecting said carrier to said drive shaft to provide a second speech ratio, a brake for said carrier for providing another speed ratio, means for connecting said first-named sun gear with said drive shaft, and means for connecting said ring gear with said driven shaft.

7. In power transmission mechanism, the combination of a drive shaft, a driven shaft, a planetary gear set for providing a power train between said shafts, said gear set including two planet gears in mesh with each other, a ring gear meshing with one of said planet gears and a sun gear meshing with the other of said planet gears, a planet gear connected with one of said first named planet gears, a carrier for said planet gears, a sun gear in mesh with said last named planet gear, a brake for said last named sun gear, means for connecting said ring gear with said driven shaft, and means for connecting said carrier with said drive shaft.

8. In power transmission mechanism, the combination of a drive shaft, a driven shaft, a planetary gear set for providing power trains of different speed ratios between said shafts, said gear set including two planet gears in mesh with each other, a ring gear meshing with one of said planet gears and a sun gear meshing with the other of said planet gears, a planet gear connected with one of said first named planet gears, a carrier for said planet gears, a sun gear in mesh with said last named planet gear, a brake for said last named sun gear, a clutch having two engaged positions and connecting said drive shaft with either said carrier or said first named sun gear, and a clutch having two engaged positions and connecting said driven shaft with either said ring gear or said carrier.

9. In power transmission mechanism, the combination of a drive shaft, a driven shaft, a planetary gear set for providing power trains of different speed ratios between said shafts, said gear set including two planet gears in mesh with each other, a ring gear meshing with one of said planet gears and a sun gear meshing with the other of said planet gears, a planet gear connected with one of said first named planet gears, a carrier for said planet gears, a sun gear in mesh with said last named planet gear, a brake for said last named sun gear, a brake for said carrier, a clutch having two engaged positions and connecting said drive shaft with either said carrier or said first named sun gear and a clutch having two engaged positions and connecting said driven shaft with either said ring gear or said carrier, said first and second named clutches when connected respectively with said first named sun gear and with said ring gear when said second named brake is engaged providing a low speed ratio and providing a higher speed ratio when said second named brake is engaged, said first and second named clutches when connected respectively with said carrier and with said ring gear when said second named brake is engaged providing an overdrive speed ratio.

10. In power transmission mechanism, the combination of a drive shaft, a driven shaft, a planetary gear set for providing gear trains of different speed ratios between said shafts, said gear set including two planet gears of the same size in mesh with each other, a ring gear meshing with one of said planet gears and a sun gear meshing with the other of said planet gears, a planet gear connected with one of said first named planet gears and being larger than said first named planet gear, a carrier for said planet gears, a sun gear in mesh with said last named planet gear, a brake for said last named sun gear, a one-way brake for said carrier, a positive type clutch having two engaged positions and connecting said drive shaft with either said carrier or with said first named sun gear, and a positive type clutch having two engaged positions and connecting said driven shaft with either said ring gear or said carrier, said first and second named clutches when engaged respectively with said first named sun gear and said ring gear providing a low speed power train through the transmission when said one-way brake is effective and providing an intermediate speed power train between said shafts when said first named brake is effective, said clutches when respectively connecting said drive shaft and said carrier and connecting said driven shaft and said ring gear providing an overdrive speed ratio between said shafts when said first named brake is engaged.

DONALD W. KELBEL.

REFERENCES CITED

The following references are of record in the file of this patent:

UNITED STATES PATENTS

| Number | Name | Date |
|---|---|---|
| 861,791 | Anderson | July 30, 1907 |
| 980,407 | Clarke | Jan. 3, 1911 |
| 2,005,726 | Banker | June 25, 1935 |
| 2,134,398 | Cotterman | Oct. 25, 1938 |
| 2,194,954 | Ravigneaux | Mar. 26, 1940 |
| 2,279,986 | Griswold | Apr. 14, 1942 |
| 2,293,358 | Pollard | Aug. 18, 1942 |
| 2,322,676 | Vincent | June 22, 1943 |
| 2,334,402 | Flinn | Nov. 16, 1943 |
| 2,381,786 | Tyler | Aug. 7, 1945 |

FOREIGN PATENTS

| Number | Country | Date |
|---|---|---|
| 5,835 | Great Britain | Mar. 1, 1907 |
| 443,735 | Great Britain | Mar. 5, 1936 |
| 48,019 | France | Oct. 16, 1937 |
| | (Addition to No. 809,102) | |
| 439,886 | France | Apr. 19, 1912 |